United States Patent

Yoshimura et al.

Patent Number: 5,687,024
Date of Patent: Nov. 11, 1997

[54] LENTICULAR LENS SHEET

[75] Inventors: Osamu Yoshimura; Ichiro Matsuzaki, both of Nigata, Japan

[73] Assignee: Kuraray Co., Ltd., Kurashiki, Japan

[21] Appl. No.: 671,544

[22] Filed: Jun. 27, 1996

[30] Foreign Application Priority Data

Jun. 30, 1995 [JP] Japan ..................... 7-165002

[51] Int. Cl.$^6$ ................................. G03G 21/56
[52] U.S. Cl. .................. 359/455; 359/443; 359/453; 359/460
[58] Field of Search ................... 359/443, 453, 359/455, 456, 457, 460

Primary Examiner—Daniel P. Malley
Attorney, Agent, or Firm—Oblon, Spivak, McClelland, Maier & Neustadt, P.C.

[57] ABSTRACT

A lenticular lens sheet comprising lengthwise long lenticular lenses formed on the light incident-side surface and light emergent-side surface thereof, the lenticular lenses being constituted of cylindrical lenses each having a long dimension in the top and bottom direction of a screen when used, and satisfying $$0.30 \leq |i_0(\theta_H)| \leq 0.36$$

when parallel light rays are made incident on the surface of its incident-side lens at horizontal incident angles of 0°, −11° and +11° and the emergent luminances of the respective light rays are standardized by evaluating the emergent luminance at an emergent-side horizontal visual angle 0° to be 1, and the emergent luminances of the respective light rays at a horizontal visual angle $\theta_H°$ are respectively represented by $I_0(\theta_H)$, $I_{-11}(\theta_H)$ and $I_{+11}(\theta_H)$, and when $|\theta_H| \leq 40°$ in the following expression (1).

$$i_0(\theta_H) = I_0(\theta_H)/(I_0(\theta_H) + I_{-11}(\theta_H) + I_{+11}(\theta_H)) \quad (1)$$

This makes it possible to obtain a lenticular lens sheet that may cause less changes with changes in horizontal visual angles and has been improved in color uniformity.

6 Claims, 9 Drawing Sheets

PRIOR ART

PRIOR ART

PRIOR ART

PRIOR ART

LENTICULAR LENS SHEET

BACKGROUND OF THE INVENTION

1. Field of the Invention

This invention relates to a screen used in rear-projection television or the like, and more particularly to a lenticular lens sheet thereof.

2. Description of the Related Art

Screens comprised of a Fresnel lens and a lenticular lens are conventionally used in rear-projection televisions or the like. Recently, rear-projection televisions have come into wide use in ordinary homes, and accordingly it is sought to make the depth of a television smaller. FIGS. 12 and 13 are schematic top views of a conventional rear-projection television and a rather recent rear-projection television, respectively. As shown in these drawings, the angle formed by a red CRT and a green CRT or the angle formed by a blue CRT and the green CRT on a screen 10, i.e., what is called the convergent angle $\theta$ ($\theta_1$ or $\theta_2$), is seen to increase with a decrease in the depth L ($L_1$ or $L_2$) of the television. In the recent rear-projection televisions, this convergent angle $\theta$ has become as large as about 10° to 12°.

In order to evaluate optical characteristics of lenticular lenses, the value given by the following expression, which is called color shift, is used.

$$C(\theta_H) = |20 \times \log [I_{-a}(\theta_H)/I_{+a}(\theta_H)]|$$

In the expression, $I_{-a}(\theta_H)$ and $I_{+a}(\theta_H)$ are respectively the emergent luminances of the respective light rays at a horizontal visual angle $\theta_H°$, where light rays are made incident on the surface of an incident-side lens at angles of a° and −a°, and the emergent luminances of the respective light rays are standardized by evaluating the emergent luminance of the light ray of at a horizontal visual angle 0° to be 1 (for example, in FIG. 13, $\theta_2 = -a°$ or $+a°$, the emergent luminance of the respective light rays at an emergent-side horizontal visual angle 0° are $I_{-a}(\theta_0)=1$ and $I_{+a}(\theta_0)=1$, and the emergent luminances of the respective light rays at a horizontal visual angle $0_H°$ are $I_{-a}(\theta_H)$ and $I_{+a}(\theta_H)$). In general, the shape of a lenticular lens is determined so that the value of color shift said above can be as small as possible.

Conventional lenticular lenses have had problems to be overcome on two points. The first is that colors change when the visual angle is changed in the horizontal direction of the screen. For example, light rays are made incident on the incident lens surface of a conventional lenticular lens at angles of −9° and +9° (this is a common example of convergent angles in the conventional television sets), and the color shift is measured when the visual angle is changed in the horizontal direction. Results thus obtained are shown in FIG. 14. Similarly, light rays are made incident at angles of −11° and +11° (this is a common example of the convergent angles in the recent television sets), and the color shift is measured when the visual angle is changed in the horizontal direction. Results thus obtained are shown in FIG. 15. As is clear from comparison of FIG. 14 with FIG. 15, the color shift is greater as the convergent angle is greater.

So far, designing and studies have been made in variety, and lenticular lenses that can provide a $C(\theta_H)$ of 3 dB or below even at incident angles of ±11° have been already available. When, however, such lenticular lenses are installed to a three-tube type rear-projection television (a television having a convergent angle of 11° and in which the respective light rays are incident on the incident surface of its lenticular lenses at angles of −11° for red light, 0° for green light, and +11° for blue light) and the horizontal visual angle is changed, the changes in colors are often noticed when viewed, even though the value of $C(\theta_H)$ is small.

The second problem is that color uniformity is poor in the horizontal direction on the screen. When white raster signals are inputted and the color of the screen is observed from the center of the screen toward its ends in the horizontal direction, in front of the television set and at a position about 3 m distant from the screen, the color looks white at the center but changes toward the ends in the horizontal direction of the screen in the conventional lenticular lenses, showing poor color flatness (what is called color uniformity).

SUMMARY OF THE INVENTION

The present invention addresses the problems in the prior art as discussed above. Accordingly, an object of the present invention is to provide a lenticular lens sheet that may cause less color changes with changes in the horizontal visual angle and that is improved in the color uniformity.

The lenticular lens sheet of the present invention that addresses the above problem comprises lengthwise long lenticular lenses each having a long dimension in the vertical direction of a screen (i.e., lenticular lenses in which each cylindrical lens constituting the lenticular lenses has a longer direction identical to the top-and-bottom direction of the screen), formed on the light incident-side surface and light emergent-side surface thereof, and satisfying $$0.30 \leq |i_0(\theta_H)| \leq 0.36$$

when three sets of parallel light rays are made incident on the surface of its incident-side lens at horizontal incident angles of 0°, −11° and +11° and the emergent luminances of the respective light rays are standardized by evaluating the emergent luminance at an emergent-side horizontal visual angle 0° to be 1, and the emergent luminances of the respective light rays at a horizontal visual angle $\theta_H°$ are respectively represented by $I_0(\theta_H)$, $I_{-11}(\theta_H)$ and $I_{+11}(\theta_H)$, and when $|\theta_H| \leq 40°$ in the following expression (1).

$$i_0(\theta_H) = I_0(\theta_H)/(I_0(\theta_H) + I_{-11}(\theta_H) + I_{+11}(\theta_H)) \qquad (1)$$

The above lenticular lens sheet may preferably satisfy $$|i_{-11}(\theta_H) - \tfrac{1}{3}| + |i_{+11}(\theta_H) - \tfrac{1}{3}| \leq 0.30$$

in the following expressions (2) and (3).

$$i_{-11}(\theta_H) = I_{-11}(\theta_H)/(I_0(\theta_H) + I_{-11}(\theta_H) + I_{+11}(\theta_H)) \qquad (2)$$

$$i_{+11}(\theta_H) = I_{+11}(\theta_H)/(I_0(\theta_H) + I_{-11}(\theta_H) + I_{+11}(\theta_H)) \qquad (3)$$

According to another embodiment of the present invention, the lenticular lens sheet that can solve the above problems comprises lengthwise long lenticular lenses each having a long dimension in the vertical direction of a screen (i.e., lenticular lenses in which each cylindrical lens constituting the lenticular lenses has a longer direction identical to the top-and-bottom direction of the screen), formed on the light incident-side surface and light emergent-side surface thereof, and satisfying $$P_{-11}(\theta_0)/P_0(\theta_0) \geq 0.93 \text{ and } P_{+11}(\theta_0)/P_0(\theta_0) \geq 0.93$$

when three sets of parallel light rays with the same luminances are made incident on the surface of its incident-side lens at horizontal incident angles of 0°, −11° and +11°, and the emergent luminances of the respective light rays at an emergent-side horizontal visual angle 0° are represented by $P_0(\theta_0)$, $P_{-11}(\theta_0)$ and $P_{+11}(\theta_0)$, respectively.

In the lenticular lens sheets of the present invention according to the above two embodiments, when pitches of a lenticular lens is homologously converted to 1 mm and the principal shape of a horizontal cross section of its incident-side lens and the principal shape of a horizontal cross section of its emergent-side lens are represented by the expression:

$$Y(X) = CX^2/[1 + \{1-(K+1)C^2X^2\}^{1/2}],$$

a reciprocal C of a curvature radius of the incident-side lens is smaller than 2.4, a conic constant K of the emergent-side lens is not smaller than 0, and, when the thickness and pitches of the lens are represented by t and p, respectively, the value of t/p is greater than 1.25.

DETAILED DESCRIPTION OF THE INVENTION

The first embodiment of the present invention that makes it possible to reduce color changes with changes in horizontal visual angle will be first described.

According to the first embodiment of the present invention, the lenticular lens sheet satisfy $0.3 \leq |i_0(\theta_H)| \leq 0.36$ when $|\theta_H| \leq 40°$ in the expression (1) said above.

Figure 1:
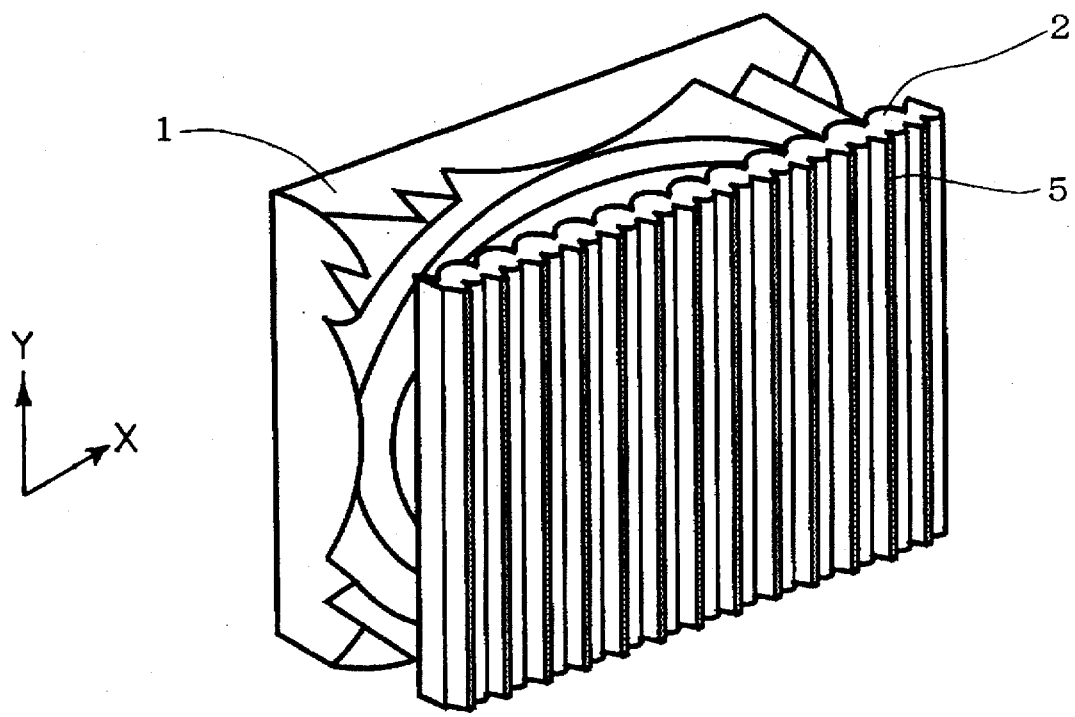
FIG. 1 is a perspective illustration of a rear-projection screen.
Figure 2:
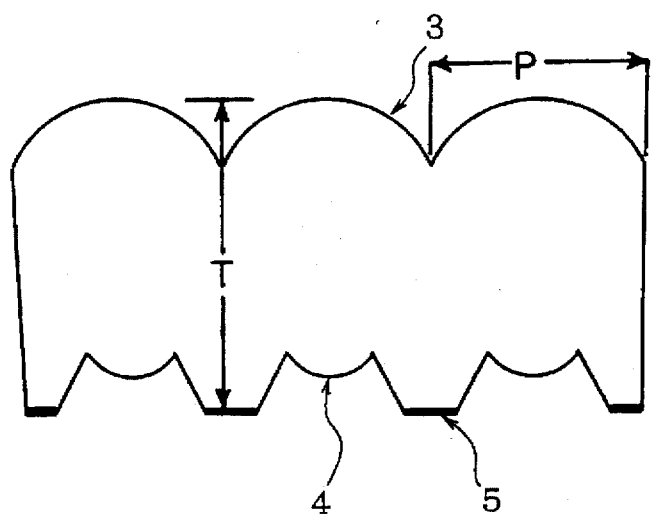
FIG. 2 is a cross-sectional view of a lenticular lens in its horizontal direction.
Figure 3:
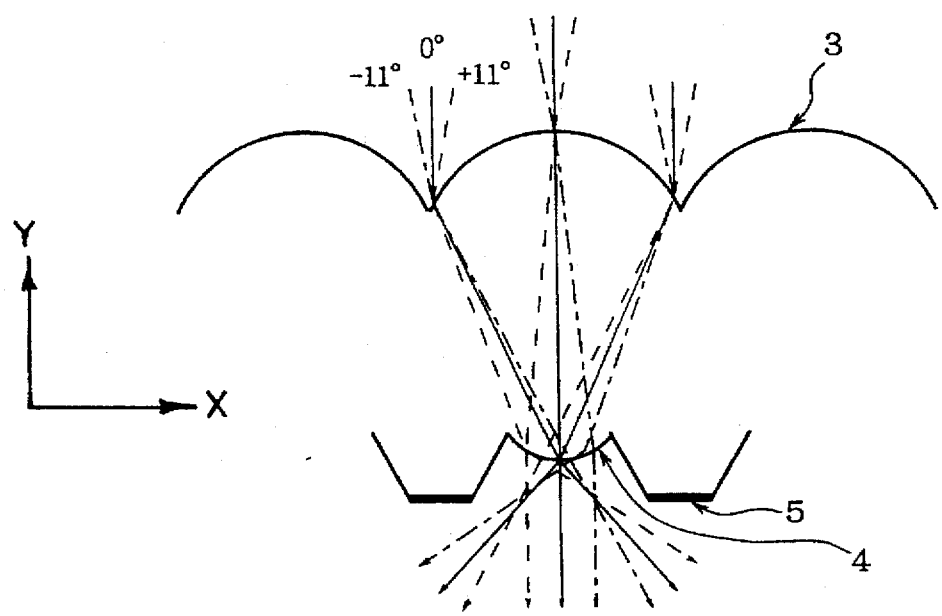
FIG. 3 illustrates the course of light rays passing through the lenticular lens.

In order to evaluate optical characteristics of lenticular lenses, not only emergent luminances of light rays incident on the surface of a incident-side lens at angles of −11° and +11° but also emergent luminances of light rays incident on the surface of the incident-side lens at an angle of 0° are useful as parameters for evaluation. And it is effective for the lenticular lenses that the numerical values of the aforementioned luminances satisfy a certain relationship. FIG. 1 is a perspective illustration of a rear-projection screen used in a rear-projection television. The screen is provided with a Fresnel lens 1 and a lenticular lens 2, the former being on the side nearer to a light source. FIG. 2 is a cross-sectional view of the lenticular lens in its horizontal direction, which is provided with an incident-side lens 3 on the side nearer to the light source, and, on the side of a viewer, an emergent-side lens 4 and a light-absorptive stripe 5 that absorbs undesirable light from outside. This shape is repeatedly provided in the horizontal direction to form a lenticular lens sheet. FIG. 3 illustrates the course of light rays passing through the lenticular lens when light rays are made incident on the lenticular lens at angles of −11°, 0° and +11°. One-dotted chain lines indicate light rays at −11°; solid lines, light rays at 0°; and broken lines, light rays at +11°.

In the description of the present invention, the angles of light rays incident on the light-incident face of the lenticular lens are often referred to as ±11°. The value of ±11° is a value that holds a part of general values of convergent angles (about ±10° to about ±12°) of the rear-projection televisions recently available. Thus, it by no means follows that the present invention is limited to only the case when used at incident angles of ±11°. For example when these angles are ±11°, the numerical relationships of $i_0(\theta_H)$, $|i_{-11}(\theta_H)-\frac{1}{3}|+|i_{+11}(\theta_H)-\frac{1}{3}|$, $P_{-11}(\theta_0)/P_0(\theta_0)$ and $P_{+11}(\theta_0)/P_0(\theta_0)$ are satisfied as said above and when the incident angles are ±10° or ±12°, their preferable ranges of the numerical relationships are only changed.

In FIG. 3, the number of light rays inputted to the incident-side lens are three rays for each, i.e., 9 rays in total. Using a computer, data of the shape of the incident-side lens, the shape of the emergent-side lens, the distance between the incident-side lens and the emergent-side lens and the like data may be inputted to perform operations to determine the emergent angles of the respective light rays and the distribution of the emergent luminances.

Figure 4:
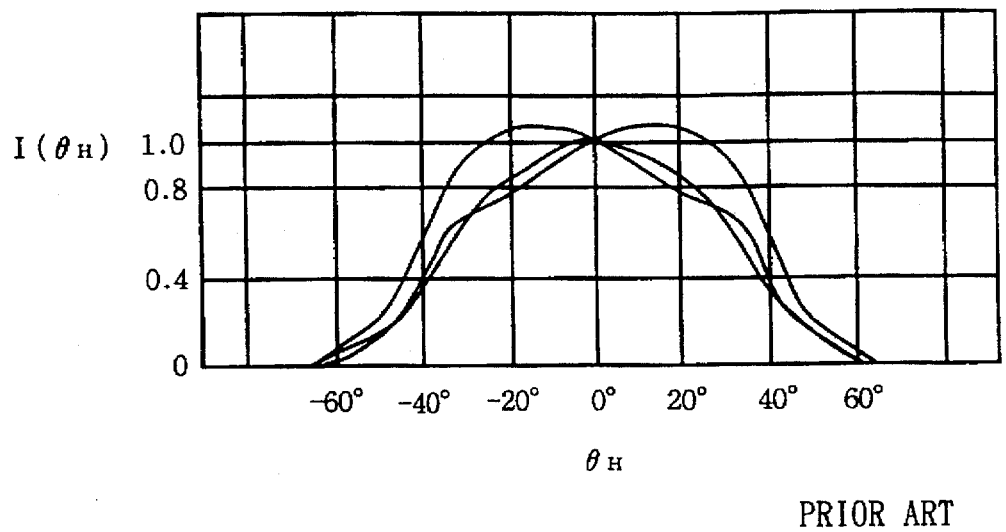
FIG. 4 is a graph showing standardized emergent luminances of a conventional lenticular lens.
Figure 5:
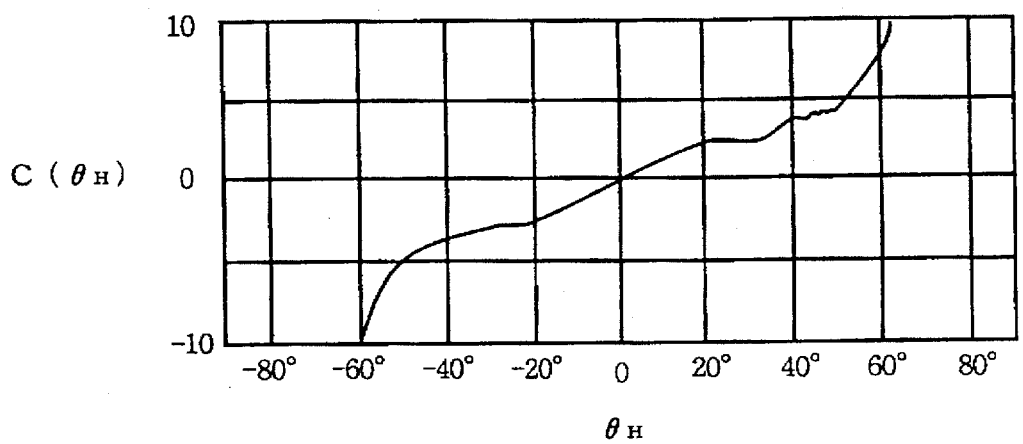
FIG. 5 is a graph showing emergent luminances (unit: decibel) of a conventional lenticular lens.

FIGS. 4 and 5 are graphs showing the results when light rays are inputted to a conventional lenticular lens at angles of −11°, 0° and +11° and the operations were performed. FIG. 4 is a graph showing emergent luminances $I(\theta_H)$ with respect to the emergent angles $\theta_H$ of the respective light rays, where in respect of the respective incident light rays the emergent luminances of the light emergent at light emergent angles 0° are regarded as 1 and the emergent luminances of the light of other emergent angles $\theta_H$ are standardized by the emergent luminances of the light emergent at light emergent angles 0°. FIG. 5 is a graph showing emergent luminance ratios between the −11° incident light rays and the +11° incident light rays at the respective emergent angles $\theta_H$, which are presented in units of decibel. This numerical value $C(\theta_H)$ has been hitherto used as the color shift value in the designing and evaluation of lenticular lenses. The smaller this value is, the less color changes in the horizontal direction may occur. Such lenticular lenses have been considered preferable.

However, when a screen having such a lenticular lens is set in an actual rear-projection television and the view angles are shifted in the horizontal direction, changes in color from red to purplish red or from blue to purplish blue occur with right-to-left changes in visual angles, and this is not preferable.

Figure 6:
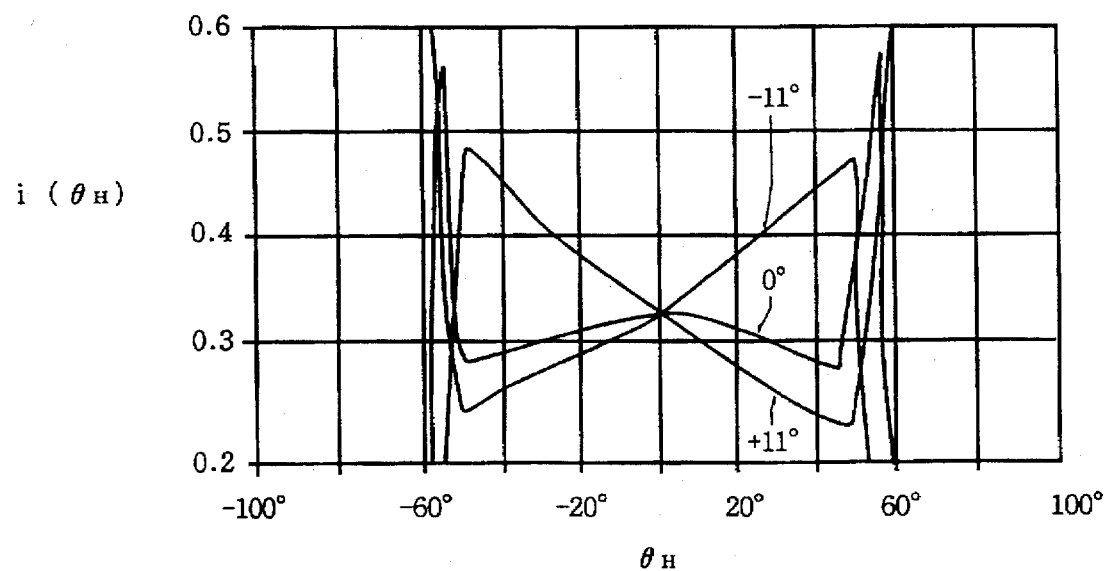
FIG. 6 is a graph showing relative luminance ratios in a conventional lenticular lens.

FIG. 6 is a graph showing relative luminance ratios in the case when light rays incident at incident angles of $-11°$, $0°$ and $+11°$ and emergent at emergent angles of $\theta_H$, which are the ratios of the emergent luminances of emergent light rays at the respective emergent angles to the total of the emergent luminances of these emergent right rays. In FIG. 6, comparing the luminance ratios of the respective colors within the range of from $+30°$ to $+50°$, the relative luminance ratios of the $0°$ incident light rays are seen to be lower than $\frac{1}{3}$. When the results thus obtained are set to correspond to the color changes of a screen viewed in an actual rear-projection television, the following will become clear. That is, even in the case of screens having small absolute values in respect of color shift values designed in accordance with conventional designing and evaluation methods, while the relative luminance of the $0°$ incident light rays has decreased, the relative luminances of the other two incident light rays increase, so that changes in color from blue to purplish blue or from red to purplish red may greatly occur with changes in visual angles in the horizontal direction in actual rear-projection televisions.

Differences in such color changes can be physically explained as follows: The color shift value which is an evaluation index in conventional methods takes note of only the luminances of light rays at angles of $-11°$ and $11°$, and, in actual rear-projection televisions, takes note of only the ratio of the emergent luminances of light rays being made incident on the lenticular lens from the red color CRT to the emergent luminances of light rays being made incident on the lenticular lens from the blue color CRT.

Figure 7:
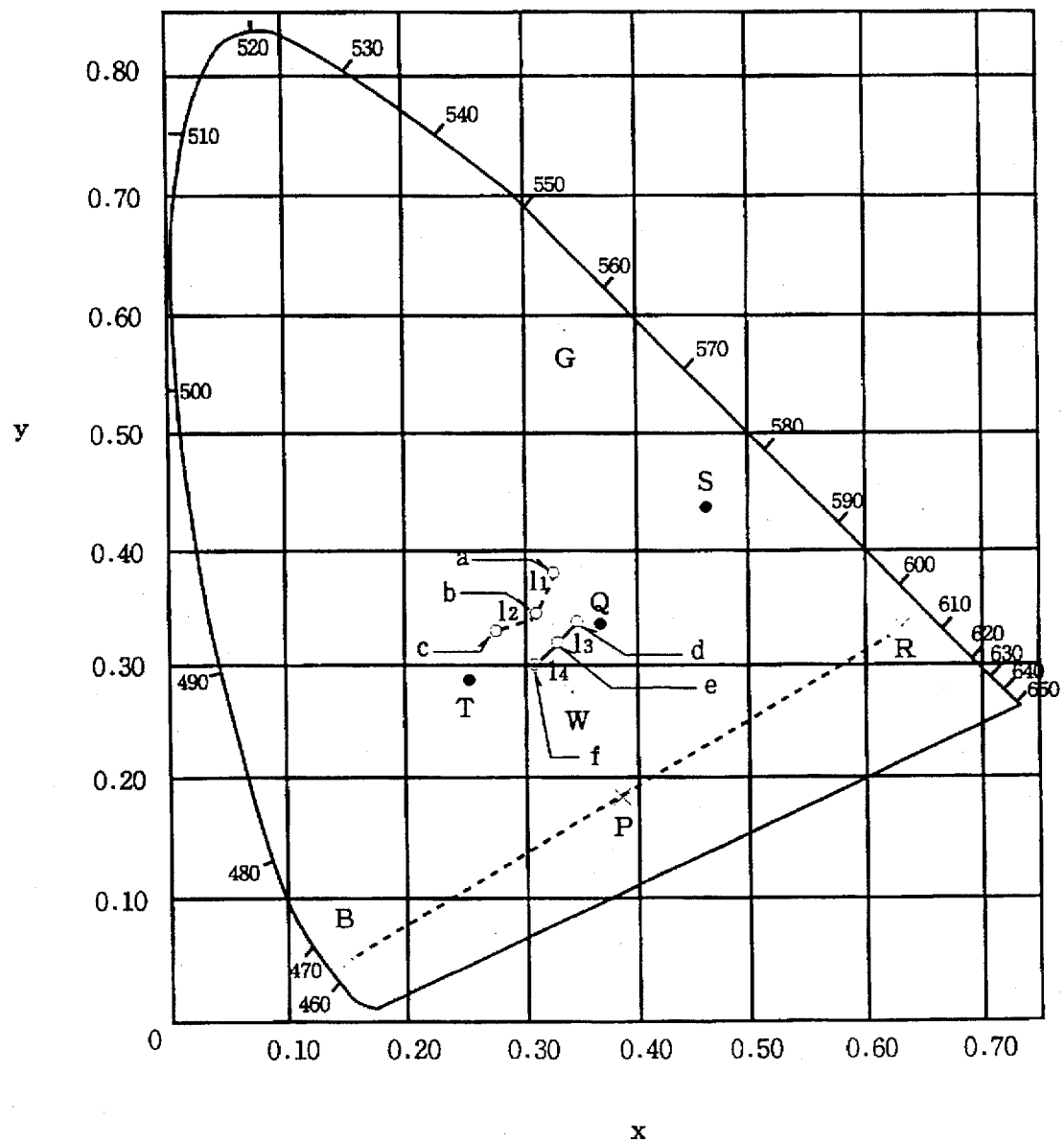
FIG. 7 is a chromaticity diagram in a XYZ colorimetric system.

FIG. 7 is a chromaticity diagram in a XYZ colorimetric system. R, G, B and W in FIG. 7 are respectively plotted by measuring color coordinates (x, y) in the normal direction of the center of a screen installed to a rear-projection television and to which red raster signals, green raster signals, blue raster signals and white raster signals are inputted. As is seen from FIG. 7, in the conventional methods, the color shift value corresponds to point P on the broken line in the drawing, and is only evaluated in a one-way fashion so that the point P comes to be at the middle of point R and point B.

In the present invention, the emergent luminance ratio of green light is employed as a parameter, and the range of this luminance is defined, and the evaluation can be made also on the luminance of green light inclusive, e.g., on point Q. Thus, it has become possible to make evaluation and lens designing also on color changes on which the evaluation has been hitherto impossible, e.g., changes to yellow color (point S) caused when luminances of red and green increase, and changes to cyan color (point T) caused when luminances of blue and green increase.

In the present invention, in the expression (1) previously set out, the emergent luminance ratio ($i_o(\theta_H)$) of incident light rays are controlled to be $0.30 \leq |i_o(\theta_H)| \leq 0.36$ within the horizontal visual angles of $+40°$, whereby a screen that may cause less color changes with changes in visual angles can be obtained. Here, if $|i_o(\theta_H)|$ of a lenticular lens sheet is smaller than 0.3, when such a lenticular lens sheet is set in a television set of convergent angle $\pm 11°$ and the color of the screen is viewed with changing the horizontal visual angle from $-40°$ to $+40°$ in the horizontal direction, the color changes greately from red to purplish red, white, purplish blue and blue. On the ohter hand, if $|i_o(\theta_H)|$ of a lenticular lens sheet is greater than 0.36, the color changes greately from yellow to pale red, white, pale blue and cyan. The reason why the range of the horizontal visual angle is set at $\pm 40°$ is that such a range of horizontal visual angle covers normal horizontal visual angles.

Figure 8:
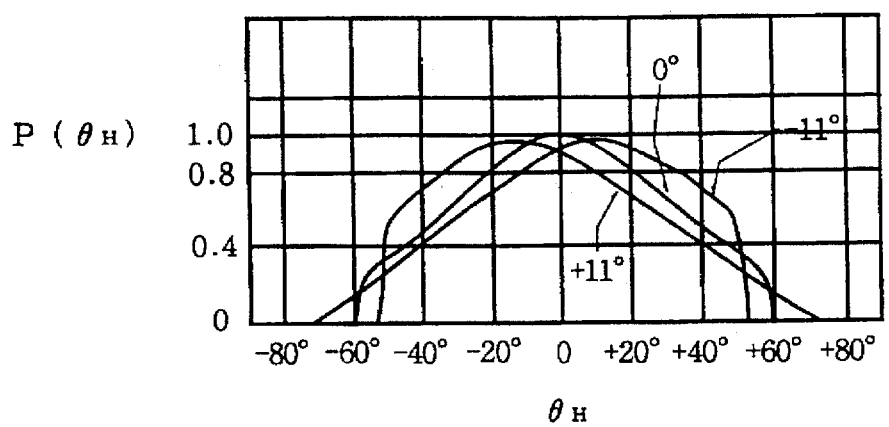
FIG. 8 is a graph showing emergent luminances of a lenticular lens.
Figure 9:
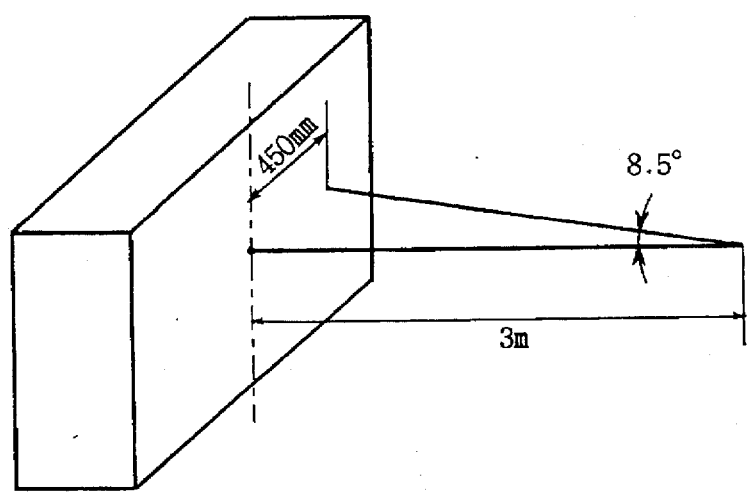
FIG. 9 illustrates conditions under which a screen is viewed.

As to the second point of the subjects, a means for improving the color uniformity, that is the second embodiment of the present invention, will be described below. FIG. 8 is a graph showing emergent luminances with respect to emergent angles of light rays, observed when parallel light rays with the same luminances are respectively made incident on the surface of a lenticular lens at incident angles of $-11°$, $0°$ and $+11$. Assume that, a rear-projection television is viewed at a normal position, for example, that as shown in FIG. 9, a 50" rear-projection television is viewed at a distance of 3 m to observe colors at the middle of its screen and colors at a position of 90% in the horizontal direction (position of $l = \pm 450$ mm) from the center of the screen, the view angles at these positions are $0°$ and $\pm 8.5°$. That is, in order to obtain a screen causing less color changes (i.e., having a good color uniformity), the luminance ratios of the respective colors observed at $0°$ and $\pm 8.5°$, the former being at a position $l=0$ mm from the center of the screen and the latter being at a distance $l = \pm 450$ mm, are required to be identical as far as possible.

Figure 10:
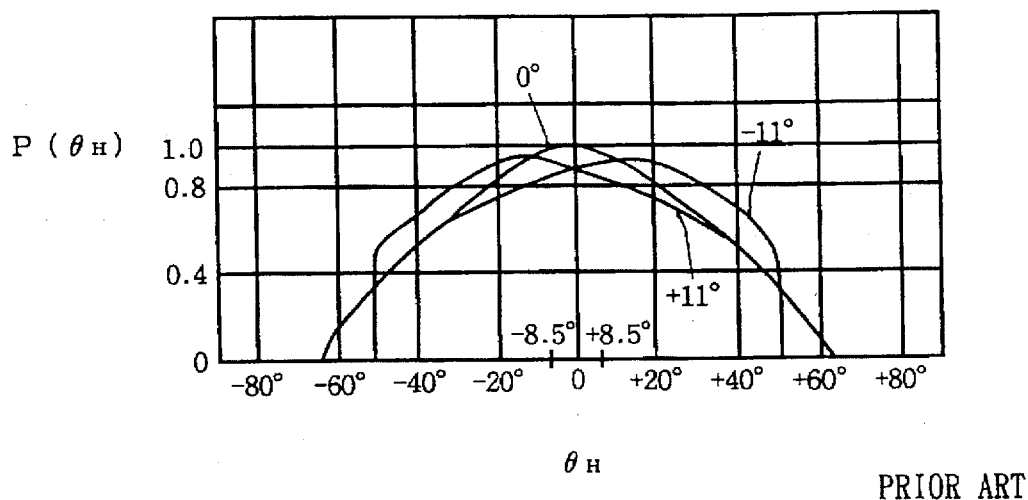
FIG. 10 is a graph showing emergent luminances of conventional lenticular lenses.

This will be further detailed by giving an example. FIG. 10 is a graph showing emergent luminances $P(\theta_H)$ at emergent-side horizontal visual angles $\theta_H$, observed when parallel light rays with the same incident luminances are made incident on the surface of a conventional lenticular lens at incident angles of $-11°$, $0°$ and $+11°$. The emergent luminance ratio $P_{-11}(\theta_o)/P_0(\theta_o)$ at the emergent-side horizontal visual angle $0°$, of the light made incident at an incident angle of $-11°$ or $0°$ is 0.90. Here, the respective light rays emergent luminances at angles of $0°$ and $\pm 8.5°$ corresponding to the view angles upon viewing the screen at the center of the television set and at a position of 90% in the horizontal direction (the position of $l = \pm 450$ mm) from the center of the screen of the 50" television, at a distance of 3 m, as described before, have emergent luminances as summarized in Table 1.

Figure 11:
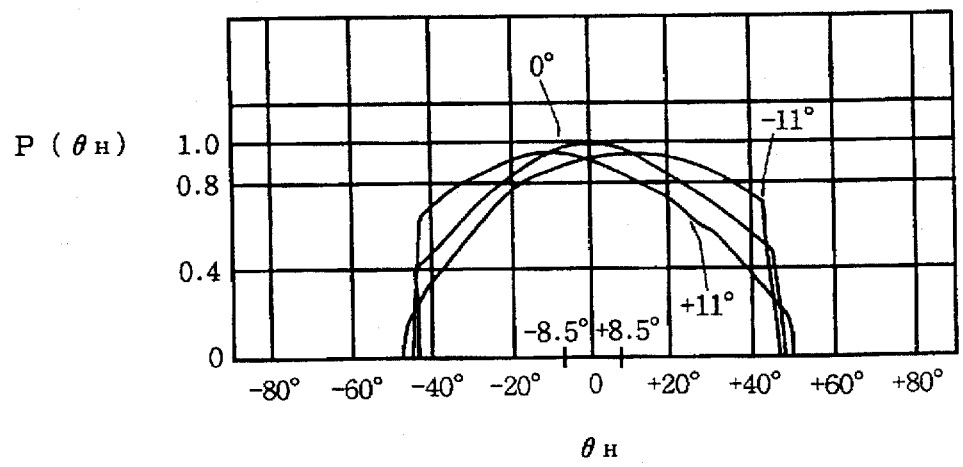
FIG. 11 is a graph showing emergent luminances of a lenticular lens according to the present invention.
Figure 12:
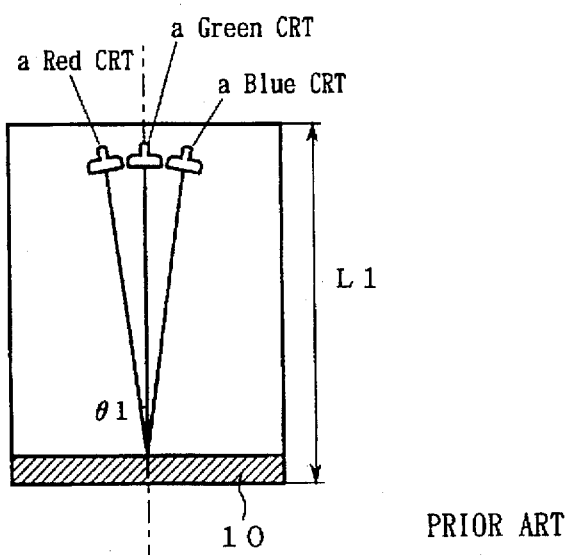
FIG. 12 is a cross-sectional view of a conventional rear-projection television.
Figure 13:
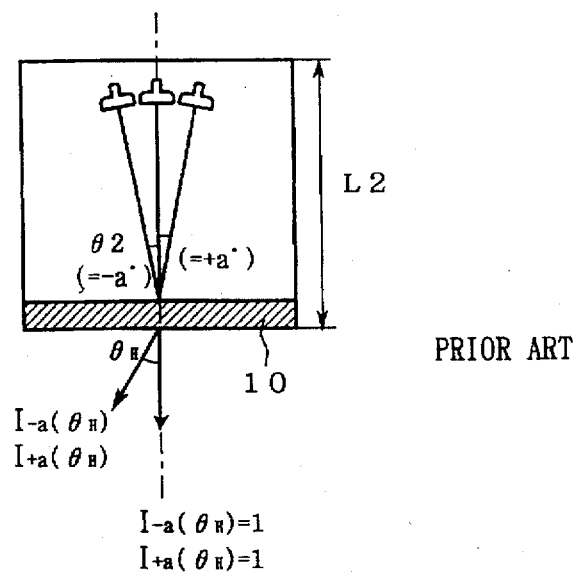
FIG. 13 is a cross-sectional view of a more recent rear-projection television.
Figure 14:
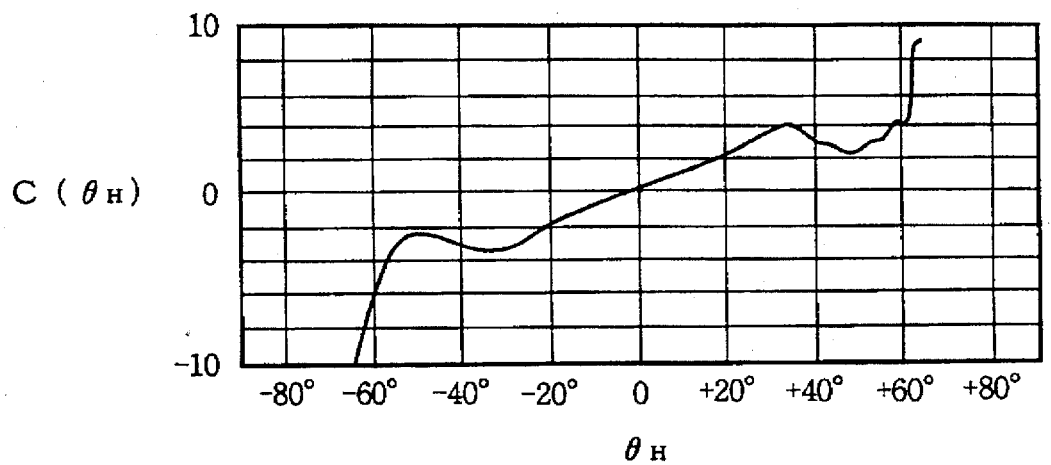
FIG. 14 is a graph showing the relationship between the horizontal visual angle and the results of measurement of color shift (incident angles: ±9°).
Figure 15:
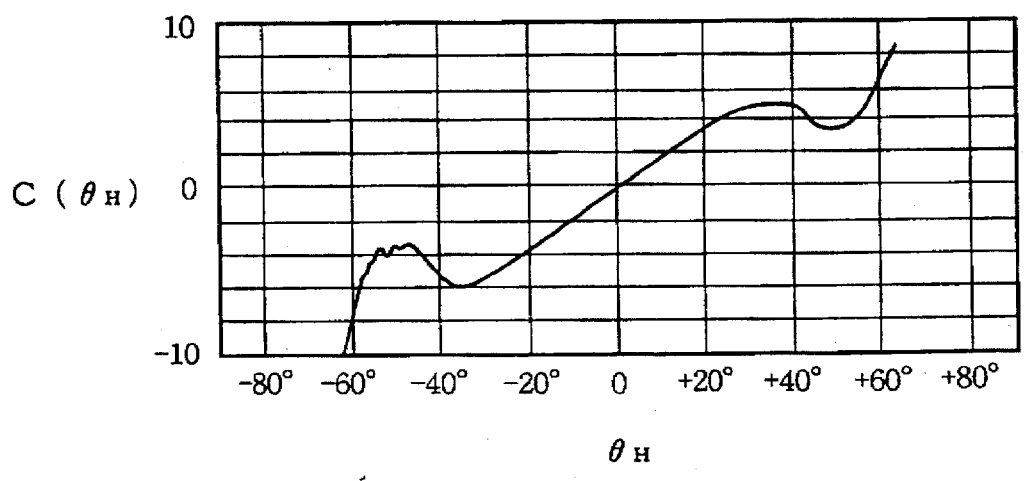
FIG. 15 is a graph showing the relationship between the horizontal visual angle and the results of measurement of color shift (incident angles: ±11°).

FIGS. 11 is a graph showing emergent luminances of the lenticular lens according to the present invention, which is so designed that the emergent luminance ratio $P_{-11}(\theta_o)/P_0(\theta_o)$ comes to be 0.93 or more, and was examined in the same manner as the above conventional lenticular lens. The light rays emergent at the position of $l=0$ mm and angles of $0°$ and the light rays emergent at the position of $l = \pm 450$ mm and angles of $\pm 8.5°$ have emergent luminances as also summarized in Table 1.

TABLE 1

|  | Conventional lenticular lens (FIG. 10) | | | Lenticular lens of $P_{-11}(\theta_0)/P_0(\theta_0) = 0.94$ (FIG. 11) | | |
| --- | --- | --- | --- | --- | --- | --- |
|  | $P_{-11}(\theta_H)$ | $P_0(\theta_H)$ | $P_{+11}(\theta_H)$ | $P_{-11}(\theta_H)$ | $P_0(\theta_H)$ | $P_{+11}(\theta_H)$ |
| Emergent luminance of light rays at horizontal visual angle of 0°: | 0.90 | 1.00 | 0.89 | 0.94 | 1.00 | 0.94 |
| Emergent luminance of light rays at horizontal visual angle of −8.5°: | 0.84 (0.87) | 0.97 (1.00) | 0.93 (0.96) | 0.89 (0.91) | 0.98 (1.00) | 0.96 (0.98) |
| Emergent luminance of light rays at horizontal visual angle of +8.5°: | 0.93 (0.96) | 0.97 (1.00) | 0.84 (0.87) | 0.96 (0.98) | 0.98 (1.00) | 0.89 (0.91) |

Emergent luminance ratios between incident light rays at −11° and incident light rays at +11° in the case when the emergent luminance of the 0° incident light rays at each horizontal visual angle is regarded as 1.0 are shown in parentheses () in Table 1. As apparent from Table 1, in the conventional lenticular lens, a difference in the ratio of $P_{-11}(\theta_H)/P_0(\theta_H)$ or $P_{+11}(\theta_H)/P_0(\theta_H)$ between at a horizontal visual angle of 0° and viewing at horizontal visual angles of ±8.5° is greater than that in the lenticular lens where the ratio of $P_{-11}(\theta_H)/P_0(\theta_H)$ is controlled to 0.93 or more.

In actual rear-projection televisions, the 0° incident light rays, −11° incident light rays and +11° incident light rays correspond to light rays incident on the lenticular lens from the green CRT, red CRT and blue CRT, respectively. The emergent luminance ratios of these light rays have the luminance ratios as shown in the parentheses () in Table 1. Accordingly, in the screen of the conventional lenticular lens upon viewing the screen at a distance of 3 m from the center of the screen, the color at a position of −450 mm in the horizontal direction from the center of the screen changes to red, and the color at a position of +450 mm therefrom changes to blue, with respect to color at the center of the screen. This reveals that such a conventional lenticular lens has a poor color uniformity.

On the other hand, it can be expected that the lenticular lens having 0.93 or more of $P_{-11}(\theta_H)/P_0(\theta_H)$ has a good color uniformity.

The respective lenticular lenses as shown in Table 1 were set in the actual rear-projection televisions, and their color coordinates at the screen center and at the positions of ±450 mm from the screen center were measured to obtain the results as shown in FIG. 7 in which the letter symbols a, b, c, d, e and f have the following meanings.

a: Color coordinate data at a position of −450 mm from the screen center in the horizontal direction in the conventional lenticular lens;

b: Color coordinate data at the screen center in the conventional lenticular lens;

c: Color coordinate data at a position of +450 mm from the screen center in the horizontal direction in the conventional lenticular lens;

d: Color coordinate data at a position of −450 mm from the screen center in the horizontal direction in the lenticular lens having 0.93 or more of $P_{-11}(\theta_0)/P_0(\theta_0)$;

e: Color coordinate data at the screen center in the lenticular lens having 0.93 or more $P_{-11}(\theta_0)/P_0(\theta_0)$; and f: Color coordinate data at a position of +450 mm from the screen center in the horizontal direction in the lenticular lens having 0.93 or more $P_{-11}(\theta_0)/P_0(\theta_0)$.

In FIG. 7 the amount of color change among the positions a, b and c is "$l_1+l_2$" shown by the broken line, and that of among the positions d, e and f is "$l_3+l_4$". Accordingly, the lenticular lens having 0.93 or more of $P_{-11}(\theta_0)/P_0(\theta_0)$ has an excellent color uniformity, as compared with the conventional lenticular lens.

In the present invention, taking note of this point, it has been discovered that the lenticular lens satisfying $$P_{-11}(\theta_0)/P_0(\theta_0) \geq 0.93 \text{ and } P_{+11}(\theta_0)/P_0(\theta_0) \geq 0.93$$

when parallel light rays with the same luminances are made incident on the surface of its incident-side lens at incident angles of −11°, 0° and +11°, and the emergent luminances of the respective light rays at an emergent-side horizontal visual angle 0° are represented by $P_{-11}(\theta_0)$, $P_0(\theta_0)$ and $P_{+11}(\theta_0)$, respectively, can provide a screen with a good color uniformity.

EXAMPLES

The present invention will be described below in greater detail by giving Examples.

Example 1

The reciprocal C of curvature radius and conic constant K of the shape of an incident-side lens, the reciprocal C of curvature radius and conic constant K of the shape of an emergent-side lens and the distance between the incident-side lens and the emergent-side lens were changed in such a way that the $i_0(\theta_H)$ may approach ⅓ as far as possible and be a constant value even with changes of $\theta_H$, where a simulation was performed using a computer.

When the width direction of a lens unit of a lenticular lens sheet is taken as an X-axis and the thickness direction of a lens unit thereof as a Y-axis, lens shapes of the incident-side and emergent-side lenses are represented by the following expression:

$$Y(X) = CX^2/[1+\{1-(K+1)C^2X^2\}^{1/2}]$$

The lens shapes thus designed are shown in Table 2 [Table 2(A)]. Pitches of the incident-side lenticular lens are fixed at 1 mm.

Using a negative mold of the incident-side lens shape, a lenticular lens sheet having the lens shape and lens-to-lens distance as designed was formed by extrusion. Parallel light rays were made incident at angles of −11°, 0° and +11°, on the surface of the incident-side lens of the lenticular lens sheet thus obtained, to measure its optical characteristics. The results of measurement are shown in Table 2 [Table 2(B)].

This lenticular lens sheet was actually set in a rear-projection television having a convergent angle of 11°, and was viewed changing the horizontal visual angle. As a result, the colors changed to red and blue, but the changes in hues were so monotonous that any color changes visually perceivable were less seen. Also, the screen was viewed at a position of 3 m distant from its front. As a result, the screen was colored in red or blue as viewed from the center of the screen toward the horizontal ends of the screen, showing a poor color uniformity.

TABLE 2

|  | Shapes of lenticular lenses | | | | |
|---|---|---|---|---|---|
|  | Shape of incident-side lens | | Shape of emergent-side lens | | Distance between lenses |
|  | C | K | C | K | (mm) |
| Example: | | | | | |
| 1 | 2.35 | −0.448 | −2.5 | +0.5 | 1.30 |
| 2 | 2.34 | −0.448 | −2.2 | +1.5 | 1.31 |
| Comparative Example: | | | | | |
| 1 | 2.52 | −0.448 | −4.0 | −1.0 | 1.21 |
| 2 | 2.50 | −0.447 | −3.5 | −3.0 | 1.20 |

|  | Optical characteristics evaluation results | | | | | | |
|---|---|---|---|---|---|---|---|
|  | $i_0(\theta_{40})$ | $i_{-11}(\theta_{40})$ | $i_{+11}(\theta_{40})$ | $C(\theta_{40})$ [dB] | $\|i_{-11}(\theta_{40}) - \frac{1}{3}\| + \|i_{+11}(\theta_{40}) - \frac{1}{3}\|$ | $P_{-11}(\theta_0)/P_0(\theta_0)$ | $P_{+11}(\theta_0)/P_0(\theta_0)$ |
| Example: | | | | | | | |
| 1 | 0.30 | 0.47 | 0.23 | 6.2 | 0.24 | 0.94 | 0.94 |
| 2 | 0.31 | 0.48 | 0.21 | 7.6 | 0.28 | 0.96 | 0.95 |
| Comparative Example: | | | | | | | |
| 1 | 0.27 | 0.40 | 0.33 | 2.0 | 0.13 | 0.90 | 0.89 |
| 2 | 0.29 | 0.44 | 0.27 | 4.2 | 0.20 | 0.92 | 0.92 | position of 3 m distant from its front. As a result, color changes were less seen throughout the center of the screen and the horizontal ends of the screen, showing a good color uniformity.

Example 2

Simulation was performed and the lens shapes were designed in the same manner as in Example 1 except that the lens shapes as shown in Table 2 [Table 2(A)] were designed. A lenticular lens sheet was formed in the same manner as in Example 1. Its optical characteristics were measured to obtain the results as shown in Table 2 [Table 2(B)].

This lenticular lens sheet was actually set in a rear-projection television having a convergent angle of 11°, and was viewed changing the horizontal visual angle. As a result, the colors changed to red and blue, but the changes in hues were so monotonous that any color changes visually perceivable were less seen.

Comparative Examples 1 and 2

Lenticular lens sheets designed by the conventional method taking note of only the luminance ratio of $i_{-11}(\theta_0)$ to $i_{+11}(\theta_0)$ are shown in Table 2 [Table 2(A)]. Such lenticular lens sheets were formed in the same manner as in Example 1. Their optical characteristics were measured to obtain the results as shown in Table 2 [Table 2(B)].

These lenticular lens sheets were each actually set in a rear-projection television having a convergent angle of 11°, and was viewed changing the horizontal visual angle. As a result, hues were changed from red to purplish red and blue to purplish blue, and color changes visually perceivable were greatly seen. Also, the screen was viewed at a position of 3 m distant from its front. As a result, the screen was colored in red or blue as viewed from the center of the screen toward the horizontal ends of the screen, showing a poor color uniformity.

By comparing the shapes of the lenticular lenses according to Examples and Comparative Examples, the following characteristic differences are made clear.

(1) The C of the incident-side lens is smaller than 2.4.
(2) The K of the emergent-side lens is 0 or greater.
(3) The thickness/pitch (t/p) of lens is greater than 1.25.
If these numerical values are outside these ranges, for example, if the C of the incident-side lens is 2.4 or greater or the t/p is 1.25 or smaller, the $|i_0(\theta_H)|$ tends to be smaller than 0.30, and if the K of the emergent-side lens is smaller than 0, the $P_{-11}(\theta_0)/P_0(\theta_0)$ tends to be smaller than 0.93.

According to the present invention, the color changes with changes in horizontal visual angles can be decreased when the emergent luminance ratios of the respective light rays incident on the lenticular lens are controlled so as to satisfy the stated conditions including the emergent luminance ratio of light rays at the incident angle of 0°. The color uniformity can also be improved when the emergent luminance of light rays incident at angles of −11° and +11° and emergent in the direction of 0° are controlled so as to satisfy the stated conditions with respect to the emergent luminance of light rays incident at an angle of 0° and emergent in the direction of 0°.

We claim:

1. A lenticular lens sheet comprising lenticular lenses elongated in the vertical direction, formed on the light incident-side surface and light emergent-side surface thereof, and satisfying $$0.30 \leq |i_0(\theta_H)| \leq 0.36$$

when three sets of light rays, the light rays of each of said sets of light rays being parallel to one another, are made incident to the surface at its incident-side lens at horizontal incident angles of 0°, −11° and +11°, and wherein the emergent luminances of the respective light rays are standardized by evaluating the emergent luminance at an emergent-side horizontal visual angle 0° to be equal to 1, and the emergent luminances of the respective light rays at a horizontal visual angle $\theta_H°$ are respectively represented by $I_0(\theta_H)$, $I_{-11}(\theta_H)$ and $I_{+11}(\theta_H)$, and when $|\theta_H| \leq 40°$:

$$i_0(\theta_H) = I_0(\theta_H)/(I_0(\theta_H) + I_{-11}(\theta_H) + I_{+11}(\theta_H)) \tag{1}$$

2. The lenticular lens sheet according to claim 1, which satisfies $$|i_{-11}(\theta_H) - 1/3| + |i_{+11}(\theta_H) - 1/3| \leq 0.30$$

in the following expressions (2) and (3)

$$i_{-11}(\theta_H) = I_{-11}(\theta_H)/(I_0(\theta_H) + I_{-11}(\theta_H) + I_{+11}(\theta_H)) \tag{2}$$

$$i_{+11}(\theta_H) = I_{+11}(\theta_H)/(I_0(\theta_H) + I_{-11}(\theta_H) + I_{+11}(\theta_H)) \tag{3}$$

3. A lenticular lens sheet comprising lenticular lenses elongated in the vertical direction, formed on the light incident-side surface and light emergent-side surface thereof, and satisfying $$P_{-11}(\theta_0)/P_0(\theta_0) \geq 0.93 \text{ and } P_{+11}(\theta_0)/P_0(\theta_0) \geq 0.93$$

when three sets of light rays with the same luminance, the light rays of each of said sets of light rays being parallel to one another, are made incident on the surface of its incident-side lens at horizontal incident angles of 0°, −11° and +11°, and wherein the emergent luminances of the respective light rays at an emergent-side horizontal visual angle 0° are represented by $P_0(\theta_0)$, $P_{-11}(\theta_0)$ and $P_{+11}(\theta_0)$, respectively.

4. A lenticular lens sheet, wherein, when pitches of a lenticular lens are 1 mm and wherein the principal shape of a horizontal cross section of its incident-side lens and the principal shape of a horizontal cross section of its emergent-side lens are represented by the expression:

$$Y(X) = CX^2/[1 + \{1 - (K+1)C^2X^2\}^{1/2}],$$

a reciprocal C of a curvature radius of the incident-side lens is smaller than 2.4, a conic constant K of the emergent-side lens is not smaller than 0, and, when the thickness and pitches of the lenses are represented by t and p, respectively, the value of t/p is greater than 1.25.

5. A lenticular lens sheet comprising lenticular lenses elongated in the vertical direction, formed on the light incident-side surface and light emergent-side surface thereof, wherein said lenticular lens sheet satisfies $$0.30 \leq |i_0(\theta_H)| \leq 0.36$$

when three sets of light rays, the light rays of each of said sets of light rays being parallel to one another, are made incident to the surface it its incident-side lens at horizontal incident angles of 0°, −11° and +11°, and wherein the emergent luminances of the respective light rays are standardized by evaluating the emergent luminance at an emergent-side horizontal visual angle 0° to be equal to 1, and the emergent luminances of the respective light rays at a horizontal visual angle $\theta_H°$ are respectively represented by $I_0(\theta_H)$, $I_{-11}(\theta_H)$ and $I_{-11}(\theta_H)$, and when $|\theta_H| \leq 40°$, $$i_0(\theta_H) = I_0(\theta_H)/(I_0(\theta_H) + I_{-11}(\theta_H) + I_{+11}(\theta_H)) \tag{1}$$

and wherein, when pitches of the lenticular lenses are 1 mm and the principal shape of a horizontal cross section of its incident-side lens and the principal shape of a horizontal cross section of its emergent-side lens are represented by the expression:

$$Y(X) = CX^2/[1 + \{1 - (K+1)C^2X^2\}^{1/2}],$$

a reciprocal C of a curvature radius of the incident-side lens is smaller than 2.4, a conic constant K of the emergent-side lens is not smaller than 0, and, when the thickness and pitches of the lens are represented by t and p, respectively, the value of t/p is greater than 1.25.

6. A lenticular lens sheet comprising lenticular lenses elongated in the vertical direction, formed on the light incident-side surface and light emergent-side surface thereof, and satisfying $$P_{-11}(\theta_0)/P_0(\theta_0) \geq 0.93 \text{ and } P_{+11}(\theta_0)/P_0(\theta_0) \geq 0.93$$

when three sets of light rays with the same luminance, the light rays of each of said sets of light rays being parallel to one another, are made incident on the surface of its incident-side lens at horizontal incident angles of 0°, −11° and +11°, and the emergent luminances of the respective light rays at an emergent-side horizontal visual angle 0° are represented by $P_0(\theta_0)$, $P_{-11}(\theta_0)$ and $P_{+11}(\theta_0)$, respectively, and wherein, when pitches of the lenticular lenses are 1 mm and the principal shape of a horizontal cross section of its incident-side lens and the principal shape of a horizontal cross section of its emergent-side lens are represented by the expression:

$$Y(X) = CX^2/[1 + \{1 - (K+1)C^2X^2\}^{1/2}],$$

a reciprocal C of a curvature radius of the incident-side lens is smaller than 2.4, a conic constant K of the emergent-side lens is not smaller than 0, and, when the thickness and pitches of the lens are represented by t and p, respectively, the value of t/p is greater than 1.25.

\* \* \* \* \*